United States Patent [19]

Swain

[11] Patent Number: 4,690,621
[45] Date of Patent: Sep. 1, 1987

[54] FILTER PUMP HEAD ASSEMBLY

[75] Inventor: Danny C. Swain, San Jose, Calif.

[73] Assignee: Advanced Control Engineering, Santa Clara, Calif.

[21] Appl. No.: 852,221

[22] Filed: Apr. 15, 1986

[51] Int. Cl.⁴ ............................................. F04B 43/02
[52] U.S. Cl. .................................... 417/313; 417/394; 417/395; 210/416.1
[58] Field of Search ........................ 417/313, 394, 395; 92/78; 210/416.1, 416.2, 416.3, 416.4, 416.5

[56] References Cited

U.S. PATENT DOCUMENTS

| | | | |
|---|---|---|---|
| 2,529,204 | 11/1950 | Van Ranst et al. | 92/78 X |
| 2,540,134 | 2/1951 | Nelson | 417/395 X |
| 3,741,687 | 6/1973 | Nystroem | 417/395 X |
| 4,146,485 | 3/1979 | Broad | 210/416.1 |

FOREIGN PATENT DOCUMENTS

2120568  12/1983  United Kingdom .............. 210/416.1

Primary Examiner—Leonard E. Smith
Attorney, Agent, or Firm—Michael J. Hughes

[57] ABSTRACT

A filter pump head assembly (10) is adapted for use with pneumatic pumping control systems. The assembly includes a rigid case subassembly (12) enclosing a chemically inert liner subassembly (14) which encloses a filter subassembly (16). The liner subassembly (14) includes a pneumatically deformable pumping membrane (72), the deformation of which varies the volume surrounding a filter cartridge (112). Various valves (33, 34 and 35) and ports are operated by selective pneumatic pressure on a top membrane (68). The control block (80) includes a bubble capture channel (94) which allows the bleeding of undesirable gas bubbles during use. The invention pump of the various disclosed embodiments is particularly adapted to pump and filter ultrapure, reactive fluids varying viscosities at a low pumping pressure. The primary current commercial usage of the invention is in the semiconductor manufacturing industry.

20 Claims, 6 Drawing Figures

FILTER PUMP HEAD ASSEMBLY

TECHNICAL FIELD

The present invention relates generally to fluid pumping devices and more particularly to devices adapted to filtering particulate matter from the fluid during the pumping process. The present invention is specifically adapted for precise dispensation of filtered fluids in situations involving relatively low volume, high accuracy dispensation of fluids, particularly fluids which are ultra pure or reactive.

DESCRIPTION OF THE PRIOR ART

Modern chemical processing techniques frequently require precise dispensation of carefully controlled fluids for various process steps. One area of technology in which fluid dispensation is particularly critical is the semiconductor manufacture industry. In this industry, it is very common for process steps to require input of carefully measured quantities of highly reactive chemicals in liquid form. It is also frequently critical to insure that the fluids are not contaminated with particulate matter prior to delivery. For this reason, filtration of the fluids can be a necessary step.

Heretofore, pumping, dispensation and filtration have been separate process steps performed independently by separate apparatus. This has required multiple device interfaces during the transfer step. This has also lead to problems with incompatible interfaces, cumbersome space utilization, trapped gas bubbles and other problems inherent in non-unitary devices.

One prior art device which attempts to combine the filtration and pumping/dispensation steps is described in U.S. Pat. No. 4,483,665 issued to H. Hauser on Nov. 20, 1984. This device utilizes separate components to accomplish the filtration and the pumping but mates them together into a single unit. The device utilizes separate valving for the two components. The pumping mechanism utilized in the Hauser device is the common bellows type of pump with filter unit located separately from the bellows.

A method of pumping fluids which has been particularly adaptable for highly reactive or ultra pure materials is pneumatic diaphragm pumping. This method incorporates pneumatically operated valving utilizing pneumatic pressure or, alternatively vacuum, to open and close valve elements. The combination of this technology with flexible diaphragms constructed of non-reactive materials, particularly Telfon TM, permits pumping and dispensation of highly reactive fluids in a precise and safe manner.

One example of a pneumatically controlled pump device adapted for use in semiconductor and related technologies is shown and described in U.S. patent application Ser. No. 612,581, filed May 21, 1984, by Danny C. Swain. The teachings of this application are commercially available in the Mariner TM pump available from Advanced Control Engineering, Inc. of Santa Clara, Calif.

None of the prior art efforts has successfully combined the advantages of pneumatic control, especially those of minimal turbulence pumping, minimum flow path restrictions, low pressure pumping and separation of the fluid being pumped from external materials, with an integral filtration element. Filtration has always been performed as a separate portion of the process, has involved specific spatial requirements and has been plagued with interconnection problems. Nothing in the prior art has successfully combined all of the pumping, dispensation and filtration elements in a space efficient, cost efficient and high accuracy system.

BRIEF DESCRIPTION OF THE INVENTION

It is an object of the present invention to provide a pump head including an integral filtration element.

It is another object of the present invention to provide a pump head in which removable and interchangeable filtration elements may be utilized.

It is a further object of the present invention to provide a pneumatically controlled filter pump assembly which includes no point valves or other turbulence creation zones in the flow path.

It is yet another object of the present invention to provide precise dispensation of filtered fluids.

It is a still further object of the invention to minimize trapped gas bubbles which tend to occur in multiple interface pumps.

It is another object of the invention to minimize the necessary fittings and interfaces in the fluid path.

The present invention is a integral filter and pump head particularly adapted for use in handling highly reactive or caustic liquids in a precisely dispensed manner. The primary usage is in the semiconductor industry where it is frequently necessary to pump a variety of ultra pure, highly volatile or reactive fluids with a minimum of particulate contamination. The assembly is also adapted for handling materials of different viscosities.

Briefly, a preferred embodiment of the present invention is a combination pump and filtration unit formed as an integral structure with the filtration element actually contained within the pump. The filter pump assembly is pneumatically controlled and includes a metallic case sub-assembly which forms the exterior portion, a liner sub-assembly, typically constructed of Teflon TM, contained within the case sub-assembly and filter subassembly encased within the liner sub-assembly. Various fluid and pneumatic ports are provided in both the case sub-assembly and the liner sub-assembly and the entire device is held together by fastening devices.

The liner sub-assembly includes the plurality of pneumatic valving positions in a control block portion. The control block also includes a bubble capture channel and fluid ports. The filter cartridge, which is the predominant element of the filter sub-assembly, is adapted to mate in a sealed manner with the output port, one of the ports on the control block. In this manner all of the fluid exiting the pump through the output port will have previously passed through the filter cartridge.

The opening and closing of valves within the pump is pneumatically controlled in a manner very similar to that shown and described in applicant's prior patent application for a "Pneumatically Operated Pump Head Assembly" filed May 21, 1984, Ser. No. 612,581. The pumping activity is accomplished by the membranes, which provide a portion of the liner sub-assembly. The flexible membranes are formed of Teflon TM and are deformed by pneumatic means.

An advantage of the present invention is that it combines both the filtration step and the pumping step into a single compact element.

Another advantage of the present invention is that the pump fluid comes in contact only with non-reactive Teflon TM elements during the filtration and pumping steps.

A further advantage of the invention is that the compact housing eliminates housing flex and thus acts to eliminate dripping and poor suckback characteristics of the pump.

Another advantage of the invention is that the construction eliminates dead space within the housing, thus minimizing the "hold-up volume", such that excess fluid is not contained within the pump.

Still another advantage of the invention is that the bubble capture channel acts to eliminate bubbles within the operational portions of the pump and prevents disruptions of the pumping process and/or blockages of the fluid during usage.

A still further advantage of the invention is that the filter pump head assembly operates with no moving parts, the only motion being accomplished by pneumatic deformation of the flexible membranes.

Another advantage of the inventive assembly is that spent or damaged filter cartridges may be easily removed and replaced.

Yet another advantage of the inventive pump assembly is that it is capable of operating at very low pumping pressures.

These and other objects and advantages of the present invention will become clear to those skilled in the art in view of the description of the best presently known mode of carrying out the invention and the industrial applicability of the preferred embodiments as described herein and as illustrated in the several figures of the drawing.

BEST MODE OF CARRYING OUT INVENTION

The preferred embodiment of the present invention is a filter pump head assembly adapted for simultaneously filtering and pumping various fluids in a measured manner. It is pneumatically controlled, includes no moving parts and is particularly suitable for use in the semiconductor manufacturing industry. Since the fluid contacting portions of the filter head assembly are all contructed of non-reactive material such as Teflon TM, the assembly is particularly well adapted for use with highly reactive or caustic materials.

Figure 1:
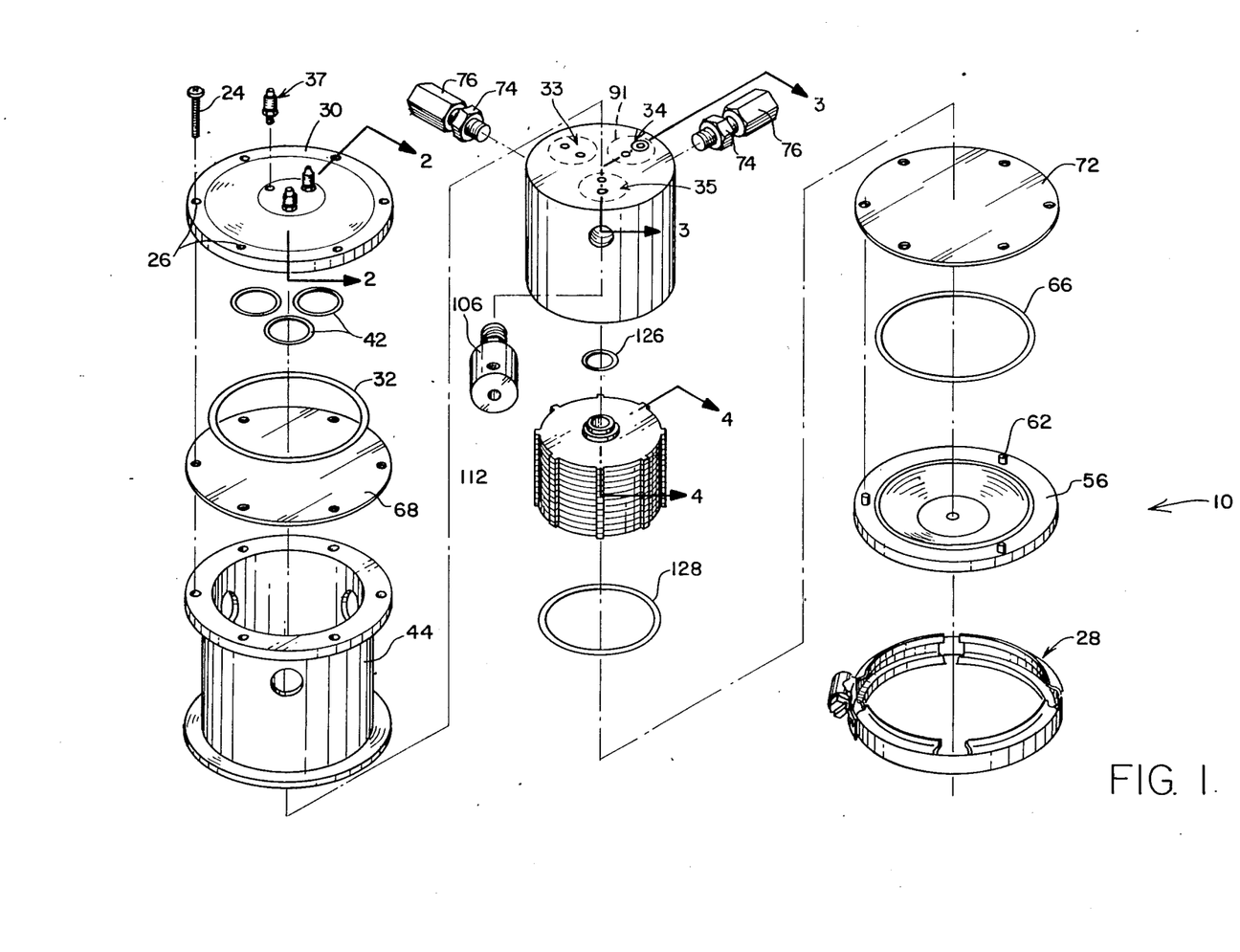
FIG. 1 is an exploded perspective view of a filter pump head assembly according to the present invention.

Referring now to FIG. 1, the filter head assembly of the present invention shown in an exploded perspective view and referred to by general reference character 10. This illustration includes all of the internal components of the assembly 10 and shows the manner in which these components are internally engaged along a common vertical axis. However, the invention is best understood by first describing three distinct sub-assemblies which act together to form the entire invention 10.

Figure 2:
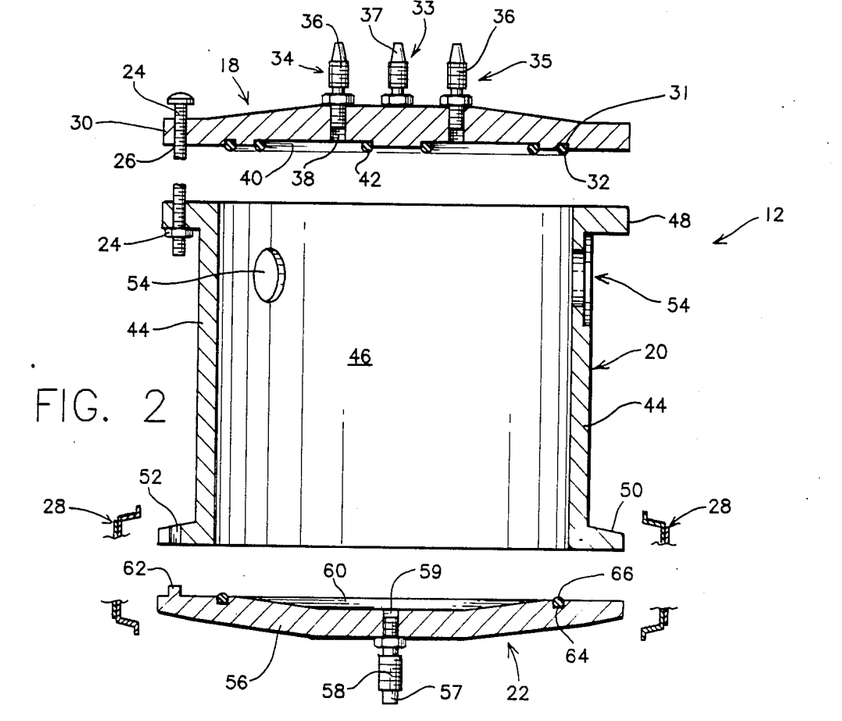
FIG. 2 is a cross-sectional view taken along broken line 2—2 of FIG. 1, showing the case sub-assembly.

The first of these sub-assemblies, illustrated in a broken cross-sectional view in FIG. 2, is a case sub-assembly designated by the reference character 12. Similarly, a liner sub-assembly adapted to be contained within the case sub-assembly 12 is shown in a broken cross-sectional view in FIG. 3 abd designated by the reference character 14. Finally, a filter sub-assembly 16 is illustrated in a similar manner in FIG. 4.

Referring now to FIG. 2, the case sub-assembly 12 is shown to include a top cap portion 18, a barrel portion 20 and a bottom cap portion 22. The top cap portion 18 is secured to the barrel portion 20 by a plurality of securing bolts 24 which are received through bolt apertures 26 in both the top cap 18 and the barrel 20. The bottom cap 22 is secured to the barrel 20 by a circumferential ring fastener 28 adapted for easy installation and removal.

The top cap portion 18 is shown to include a substantially solid top cap plate 30 having a generally flat bottom and a curved top. A circular O-ring depression 31 is situated in the bottom surface of the top cap plate 30 to receive a fluid seal O-ring 32. The fluid seal O-ring 32 is constructed of a firm yet flexible material and it is adapted to have a radius approximately equal to the depth of the O-ring depression 31. The top cap plate 30 further includes an inlet port 33, an outlet port 34 and a bleed port 35, each in the form of similar pneumatic valve portion structures 36. In the preferred embodiment there are three pneumatic port structures 33, 34 and 35 are indistinguishable in the case subassembly 12 and designed to operate the three different fluid paths within the filter pump asembly 10. In this embodiment the pneumatic port structures 36 are substantially identical, the only difference being position.

As illustrated, the pneumatic valve port structure 36 includes a pneumatic connector 37 which mates with the top cap 30, typically in a threaded manner. The pneumatic connector 37 is adapted to be attached via standard tubing to pneumatic control equipment of a conventional nature. A typical pneumatic control system is that marketed by Advanced Control Engineering of Santa Clara, Calif. under the "Mariner" trademark. The pneumatic connector 37 mates with a vertical pneumatic passage 38 formed in the top cap 30. The pneumatic passage 38 connects the connector 37 with a valve cavity 40 created on the lower surface of the top cap 30. The valve cavity 40 is circular with the circumferential portion being occupied by a top pneumatic port O-ring 42. The structure of the O-rings 33 and 42 is seen more clearly in FIG. 1.

The barrel portion 20 includes a barrel body 44 surrounding a central cavity 46. The central cavity 46 is in the nature of a right cylindrical volume open to the top and the bottom. The barrel body 44 is provided with a circumferential top barrel flange 48 and a circumferential bottom flange 50. The top barrel falnge 48 includes the bolt apertures 26 and permits attachment of the top cap 30 to the barrel body 44. The bottom barrel flange 50 is wedge shaped with a thickest part of the flange 50 being adjacent to the barrel body 44. The incline of the bottom barrel flange 50 is useful in that is causes the sealing force of the ring fastener 28 to be concentrated more strongly near the central cavity 46 than at the circumferential extreme. This is desirable in order to achieve proper seals. The bottom barrel flange 50 is also provided with a series of registration pin apertures 52 formed in its lower surface.

The barrel body 44 is also provided with a plurality, three in the preferred embodiment, of fluid port apertures 54. The fluid port apertures 54 permit the pumped and filtered fluid to be input and output from the pump head assembly 10.

The bottom cap portion includes a bottom cap plate 56 which is generally disk-shaped. The bottom cap plate 56 includes a pumping valve port structure 57 analogous to the pneumatic valve port structure 36 of the top cap portion 18. In the port structure 57, a pneumatic connector 58 is threadably mated with a pneumatic passage 59 extending axially through the bottom cap plate 56. The upper surface of the bottom cap plate 56 is formed to include a reservoir cavity 60 having a preselected volume.

The bottom cap plate 56 further includes a series of registration pins 62 adapted to mate with the registration pin apertures 52 formed on the barrel portion 20. A circular O-ring depression 64 for receiving a fluid seal O-ring 66 is also provided on the upper surface of the bottom cap plate 56. The fluid seal O-ring 66 is similar to that of the ring 32. The exterior of the bottom surface of the bottom cap plate 56 is angled in an opposing manner to that of the bottom barrel flange 50 to further improve the quality of seal at the position of the fluid seal O-ring 66 when the ring fastener 28 is tightened.

Figure 3:
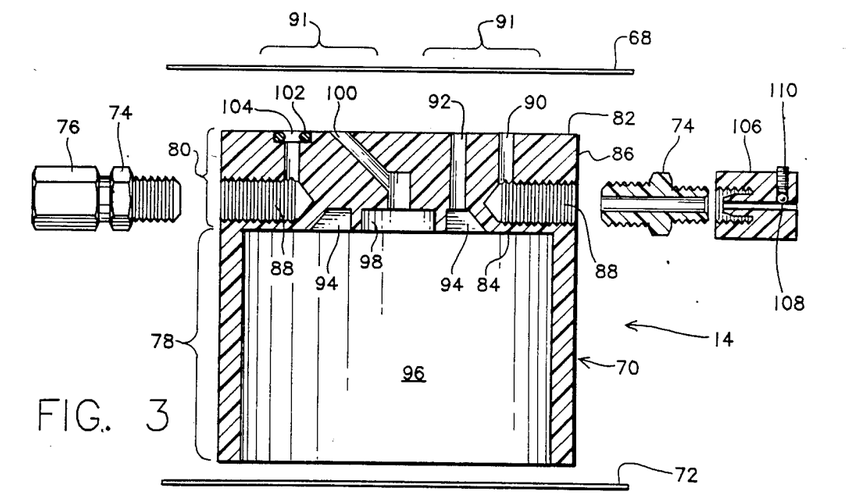
FIG. 3 is a cross-sectional view taken along broken line 3—3 of FIG. 1, showing the liner sub-assembly.

The liner sub-assembly 14 is illustrated in the broken cross-sectional view of FIG. 3. The liner sub-assembly 14 is adapted to fit within the case sub-assembly 12 and to completely issolate the case sub-assembly 12 from the fluid which is being pumped and filtered. On the other hand, all of the components of the liner sub-assembly 14 actually come into contact with the pumped fluid.

The liner sub-assembly 14 includes a top membrane 68, a barrel liner portion 70, a bottom membrane 72, a threaded interface member 74 and a fluid connector 76. The top membrane 68 and the bottom membrane 72 are thin disks of non-reactive material, typically Teflon TM, with enough flexibility to be easily pneumatically deformed. The interior-facing sides of the membranes 68 and 72 will come into contact with the pumped fluid while the exterior-facing sides will come into contact with the pneumatic gas.

The threaded interface members 74 are adapted to mate with the barrel liner portion 70 and to pass through the fluid port apertures 54 of the case sub-assembly 12. The fluid connector 76 provides an interface between the pump head assembly 10 and the external fluid handling aperatus. Typically the fluid connector 76 will interface with a tube carrying the fluid either from or to reservoirs or reaction vessels. The fluid connectors 76 are associated with the inlet port 33 and the outlet port 34 but not with the bleed port 35. The barrel liner portion 70 includes two distinct portions, a cartridge liner portion 78 and a control block portion 80. The cartridge liner 78 serves to enclose the filter sub-assembly 16 and to issolate the filter sub-assembly 16 and the pumped fluid from the case sub-assembly 12, primarily from the barrel body 44. The cartridge liner further opeates to provide a sealing surface against which the fluid seal O-ring 66 forces the bottom membrane 72. This Telfon TM to Teflon TM seal assures minimization of leakage. The control block portion 80 includes the fluid valve passages necessary for the pump assembly 10 to operate properly.

The control block portion 80 is a solid disk having an upper surface 82, an interior surface 84 and a circumferential surface 86. The control block 80 is bored with various apertures, ports, and depressions to permit and facilitate proper operation of the pump head assembly 10. The circumferential surface 86 includes three distinct threaded fluid ports 88 adapted to receive the threaded interface members 74. A vertical port tube 90 connects the threaded fluid port 88 with the upper surface 82 of the control block 80. This structure is identical for the inlet port 33 and the bleed port 35.

The areas of the upper membrane 68, which lie directly above the vertical port tube 90 and are bounded on their reverse side by the pneumatic port rings 42, are in the form of valve deformation zones 91. The valve deformation zones 91 represent the area of the membrane 68 which may be deformed either to open or to close the ports 33, 34, and 35. The remaining portion of the valve structure includes a valve tube 92 which, in the case of the inlet port 33 and the bleed port 35, connects the upper surface 82 within the deformation zone 91 to the lower surface 84, with the valve tube 92 terminating in a bubble capture channel 94. The bubble channel 94 is a circular ring-shaped depression in the lower surface 84. The cross section of the channel 94 is triangular such that bubbles are urged to the top. The bubble channel 94 is directly adjacent to and opens into a cartridge cavity 96 which is contained within the cartridge liner portion 78 and is adapted to receive the filter cartridge and the fluid. The fluid which is being pumped through the assembly 10 is primarily contained in the cylindrical volume of the cartridge cavity 96 during the pump operation.

The bubble channel 94 concentrically surrounds a cartridge interface depression 98 which is also formed in the lower surface 84. The cartridge interface depression 98 is adapted to receive the filter sub-assembly 16 in a sealed fashion so that no fluid enters an outlet port tube 100 extending from the cartridge interface 98 to the upper surface 82 unless the fluid has first passed through the filter sub-assembly 16. The lower portion of the outlet port tube 100 is in the center of the control block portion 80 but the tube 100 angles radially outwardly and upwardly such that that the opening on the top surface 82 is within the valve deformation zone 91 of the outlet port 34. The vertical port tube 90 of the outlet port 34 has, at the interface of the top surface 82, a outlet O-ring 102 seated in an O-ring depression 104. The outlet O-ring 102 is necessary only on the outlet valve 34 to prevent leakage by way of capillary action. The O-ring depression 104 is sufficiently deep that the outlet port O-ring 102 extends only to the upper surface 82. However, the flexibility of the O-ring 102 and the upper membrane 68 is sufficient to form an excellent seal.

For the inlet port 33 and the outlet port 34, the fluid connectors 76 are merely conventional elements for interfacing between the pump and exterior fluid carrying tubes. However, with respect to the bleed valve 35, a bleeder valve cylinder 106 is attached to the threaded interface member 74 in place of the fluid connector 76. The bleeder valve cylinder 106 has a longitudinal bore which is partially occluded by a blocking ball 108. The degree of blockage by the blocking ball 108 is adjustable by way of a set screw 110 accessible from the exterior of the bleeder valve cylinder 106. The bleed valve 35 is desirable to allow the escape of air bubbles from the bubble channel 94 with mininum escape of fluid. This helps to eliminate gas bubbles in the assembly and to prevent bubble passage along the fluid path.

Figure 4:
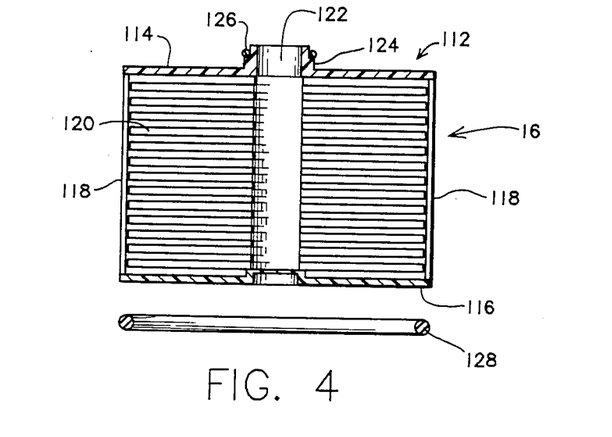
FIG. 4 is a cross-sectional view taken along broken line 4—4 of FIG. 1, showing the filter sub-assembly.

Referring now to FIG. 4, the filter subassembly 16 is illustrated in a cross-sectional view similar to that of FIG. 2 and FIG. 3. The filter subassembly 16 primarily includes a filter cartridge 112 adapted to fit within the cartridge cavity 96. The filter cartridge 112 includes a solid top end plate 114, a solid bottom end plate 116, a series of support ridges 118 extending along the circumferential cylindrical surface and a plurality of filter disk members 120. Each of the filter disk members 120 is in the form of a flat disk being porous on its axial surfaces and being connected near the center to an elongated, cylindrical central tube 122. The portion of the central tube 122 which extends beyond the top end plate 114 is surrounded by an interface ridge 124. The diameter of the interface ridge is approxiately equal to the interior diameter of the cartridge interface depression 98. Seated on top of the interface ridge 124 is an interface O-ring 126 which forms a seal with the surface of the cartridge interface depression 98 such that fluid can enter the outlet port tube 100 only from the central tube 122 of the filter cartridge 112.

The filter sub-assembly 16 further includes a positioning ring 128 which abuts against the lower surface of the bottom end plate 116 to urge the filter cartridge 112 upward into the cartridge interface depression 98 to form a tight seal.

Figure 5:
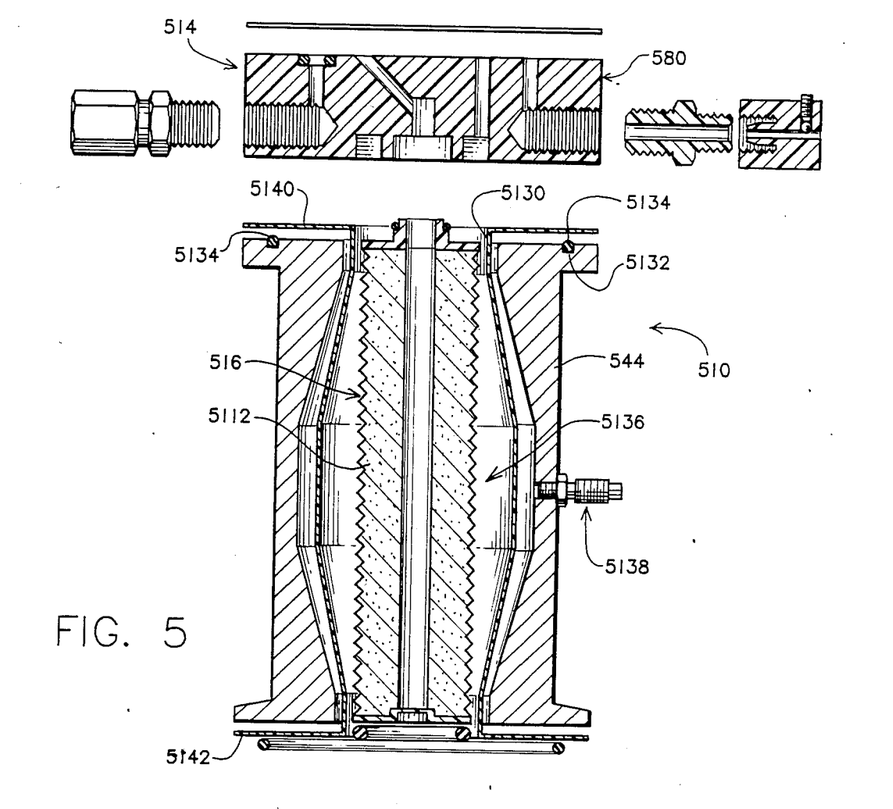
FIG. 5 is a cross-sectional view, similar to that of FIG. 3, showing an alternate embodiment of the invention.

FIG. 5 is a cross-sectional view similar to those of FIGS. 2, 3 and 4 showing an alternate embodiment 510 of the assembly 10. The alternate assembly 510 is particularly adapted for higher volume and elongated filter cartridge usage. For ease of understanding, the elements of the alternate embodiment 510 which are unchanged from those of the preferred embodiment 10 retain the same reference numerals. Where elements are altered between the two embodiments, the same reference numeral as before is utilized, only in this instance the numeral is preceeded by the digit 5. Components in the alternate embodiment 510 which are not analogous to a component in the preferred embodiment 10 are given numerals beginning with 5 and having a suffix which does not correspond to previously described elements.

The illustration of FIG. 5 shows all of the alternate liner sub-assembly 514 and the alternate filter subassembly 516, as well as an alternate barrel body 544. With the exception of the barrel body 544, no other components of the alternate case subassembly 512 are in any way altered from those of the preferred embodiment 10. Therefore, the remainder of the alternate case sub-assembly 512 is not illustrated.

The alternate embodiment 510 is adapted to operate in exactly the same manner and to serve the same purpose as the preferred embodiment 10 but is specifically structured to deal with alternate filter cartridges 5112 which are substantially elongated as compared to the preferred filter cartridge 112. The use of an elongated filter cartridge 5112 permits more rapid filtration of the fluid, pumping of more viscous fluids, faster flow rates and higher volume operations. The exact type of alternate filter cartridge 5112 utilized can vary. Instead of a filter of the structure such as that illustrated in FIG. 4 a porous "pleated" type filter may be utilized. The illustration of FIG. 5 is intended to show this type of filter.

An element which is present in the alternate embodiment 510 but not in the preferred embodiment 10 is a tubular membrane 5130. The tubular membrane 5130 is adapted to surround the filter cartridge 5112 and provide the primary pumping force to urge the liquid through the filter 5112 and through the remainder of the pump. The alternate barrel portion 544 is provided with an annular O-ring depression 5132 for receiving a sealing O-ring 5134. The sealing O-ring 5134 acts to force the tubular membrane 5130 against the lower surface 84 of the control block portion 580. Since the O-ring 5134 is on the pneumatic side of the seal, its provides an effective weld of the adjacent Teflon TM elements and prevents fluid leakage.

The interior of the alternate barrel portion 544 includes an elongated fluid chamber 5136. In order to obtain higher volume pumping, the elongated fluid chamber 5136 is not purely cylindrical but has a greater diameter at the center than at the vertical ends. This substantially increases capacity and allows for flexing of the tubular membrane 5130. The pneumatic force necessary to expand and contract the tubular membrane 5130, and thus pump the fluid, is delivered to the elongated fluid chamber 5136 through a main pumping port 5138. In the alternate embodiment 510, the main pumping port 5138 is situated in the approximate axial center of the alternate barrel portion 544.

It is noted that, in addition to the semi-cylindrical tube portion of the tubular membrane 5130, this membrane is further provided with a top membrane flange 5140 and a bottom membrane flange 5142. These flanges, which are an integral part of the membrane 5130, provide a means for sealing the fluid chamber in a manner such that the fluid never comes into contact with the alternate case subassembly 512.

It is noted that in the preferred embodiment 10 the barrel portion 44 encases both the barrel liner 78 and the control block portion 80. This is not the case in the alternate embodiment 510. There is no element equivalent to the barrel liner 78 in the alternate embodiment 510 because the tubular membrane 530 serves to sufficiently isolate the fluid from the barrel portion 544. Therefore, no liner is necessary. The alternate control block 580 also exists without any casing circumferentially surrounding it. Since the Teflon TM material of the control block 580 has a very high degree of structural integrity, it may act as a structural member itself in these circumstances. For example, the seal of the top membrane flange 5140 caused by the sealing O-ring 5134 occurs against the underside 584 of the control block portion 580, rather than against metal member. It has been found that this provides adequate seal. A further difference in the alternate barrel portion 544 is that, since it does not encase the control block portion 580, it is not necessary to provide elements equivalent to the fluid port apertures 54 of the preferred embodiment 10.

It is noted that the tubular membrane 5130 need to be a classical tubular shape so long as proper flexibility and sealing is accomplished. For example, a crenelated or "pleated" type of membrane may be substituted for the tubular membrane 5130 without substantially affecting the operation of the alternate pump 510. Although this type of membrane is traditionally expnded and contracted by mechanical means, it has been found that the pneumatic forces utilized in the invention will operate the pumping action adequately with this type of membrane as well as with the tubular type illustrated.

Figure 6:
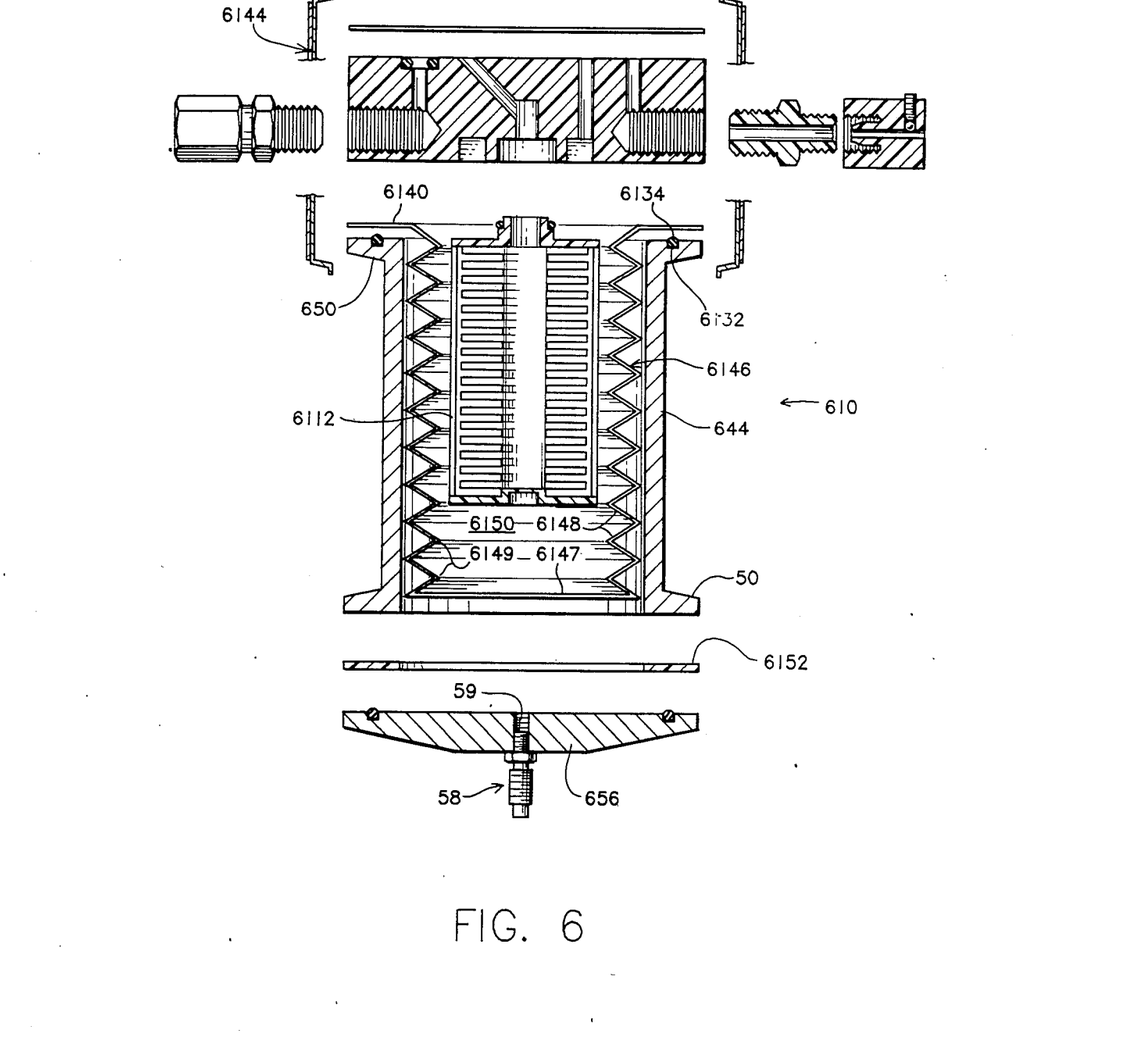
FIG. 6 is a cross-sectional view, similar to that of FIG. 3, showing a further alternate embodiment of the invention.

FIG. 6 illustrates a second alternate embodiment 610 of the invention. The name numbering conventions apply as with embodiment 510 except that the initial digit is 6 instead of 5. The second alternate embodiment 610 may be generally described as a pneumatic bellows pump. The principle of operation is nearly the same as with the other embodiments except that a longitudinal compression, rather than a balanced restriction, in utilized.

As may be seen from FIG. 6, the upper portions of the second alternate assembly 610 are substantially identical to the first alternate assembly 510. The control block 80 remains the same, as does the top cap 18. The only difference in this portion of the assembly 610 is to provide an upper ring fastener 6144, broad enough to encompass the control block 80 and to squeeze together from the top cap 18 to the alternate barrel portion 644. The upper ring fastener 644 is provided with gaps or apertures to receive the interface adapters 74. The use of the upper ring fastener 644, as opposed to the securing bolts 24 of the other embodiments; is to maximize the ease of assembly and disassembly at the top end. This is necessary in the second alternate embodiment 610 because the filter cartridge 6112 is not accessible from the bottom, as it is in the other embodiments.

The primary unique aspect of the second alternate embodiment 610 is the use of a bellows membrane 6146. The bellows membrane is similar to the tubular membrane 5130 except that it is enclosed at its lower end to form a relatively rigid base plate 5147 and is formed to resemble an accordion bellows in that a plurality of side pleats 6148 are provided along its length. The material of the bellows membrane 6146 is relatively inflexible except at conjunctions 6149 of adjacent side pleats 6148 such that the overall bellows membrane 6146 is subject to axial expansion and contraction but does not radially deform to any significant dergree.

The bellows membrane 6146 is mounted at its top end in a manner similar to that of the tubular membrane 5130, and is sealed in position by the use of a top membrane flange 6140. The cartridge cavity is thus entirely enclosed by the bellows membrane 6146 and the control block 80. The volume is variable depending on the degree of longitudinal expansion of the bellows membrane 6146. As shown in FIG. 6, the barrel 644 is elongated substantially beyond the bottom of the filter cartridge 6112, to form an expansion volume 6150. This volume 6150 permits axial expansion of the bellows membrane 6146 and increases the usable fluid volume of the pump assembly 610.

FIG. 6 illustrates the bellows membrane 6146 in fully expanded mode, that position at the end of the "fill" stroke where the maximum amount of fluid is contained within the pump. When the bellows membrane 6146 is compressed by positive pneumatic pressure the base plate 6147 will be flush against the bottom plate 6116 of the filter cartridge 6112.

The bottom cap plate 656 differs from that of the preferred embodiment 10 in that it need not be hollowed out to form a reservoir cavity 60. Since the bellow membrane 6146 is sealed at the bottom by the planar base plate 6147, no bottom membrane 72 is necessary or desirable. The pnuematic gas acts directly to compress the membrane 6146 so a planar upper interior surface is permissible on the bottom cap plate 656. Since the bottom membrane 72 is absent it is desirable to provide a pneumatic gasket 6152 intermediate the barrel portion 644 and the bottom cap plate 565. The pneumatic gasket 6152 acts to maintain the pressure integrity of the pneumatic gas during operation.

In all other respects, the structure of the second alternate embodiment 610 is similar to that of the other embodiments 10 and 510.

The materials and dimensions selected for the components of the invention are not critical to its operation but may be selected depending on the particular fluid being pumped and the volume desired. For the typical highly reactive fluids utilized in the semiconductor chip manufacturing process, the fluid contacting elements will be constructed of Teflon TM or Kalrez TM. It is important that a material which is inert to the pumped fluid be utilized. Both cited materials fit this requirement. Teflon TM has been found to be desirable for the purposes involved, including the membranes, but Kalrez TM is desirable in the case of the outlet port O-ring 102 because of its superior flexibility and the better seal which is accomplished thereby. It is noted that the outlet port 102 is the only one of the O-rings in the pump assembly 10 which actually comes into contact with the fluid. Therefore, the remaining O-rings may be constructed of conventional rubbers or synthetics such as Viton TM or Buna-N.

The preferred material for construction of the case subassembly is aluminum because of its structural inegrity, low cost, and machineability. However, this is a matter of choice and numerous other materials will operate as well.

For the preferred embodiment 10 the filter cartridge 112 is a Millipore TM F-16 Wafergard TM cartridge while the preferred alternate filter cartridge 5112 is a Millipore TM CW01TP1 Wafergard TM cartridge. Various other filter cartridges may be substituted without altering the invention, provided that the dimensions of the other elements are adjusted to receive the necessary portions of the cartridge.

Various other modifications and alterations of the assembly may be made without departing from the invention. Those skilled in the art will readily recognize additional alternate embodiments and uses. Accordingly, the above disclosure is not to be construed as limiting and the appended claims are to be interpreted as encompassing the entire spirit and scope of the invention.

INDUSTRIAL APPLICABILITY

The filter pump head assembly 10 and alternate assemblies 510 and 610 according to the present invention are adapted to be utilized in conjunction with conventional pneumatic controls and fluid carrying components. They are particularly suited for use in the semiconductor manufacturing industry wherein it is critical to dispense precise amounts of highly reactive fluids which are free from particulate contamination. The pneumatic pumping action of the invention is also particularly well adapted for pumping and filtering fluids of widely varying viscosities.

The operation of the pump head assembly 10 is best understood in conjunction with FIGS. 1, 2 and 3. As seen in FIG. 1, the three areas in which fluid flow within the control block 80 (see FIG. 3) is controlled are the port zones or valve zones 33, 34 and 35. These have been assigned positions as the inlet port zone 33, the outlet port zone 34 and the bleed port zone 35 in the drawings (see above discussion).

As seen in the drawing, the pumped fluid will only come into contract with the elements illustrated in FIG. 3, which are exclusively Teflon TM in the preferred embodiment, while the pneumatic fluid (air) only touches the elements of FIG. 2 plus the outside surfaces of the top membrane 68 and the bottom membrane 72. The pneumatic pressure which opens and closes the valve zones 33, 34 and 35 will be applied on the top membrane 68 directly above the dotted lines shown in FIG. 1. Selective application of positive and negative pneumatic pressure on these zones results in opening and closing the valves by occluding and freeing the upper ends of the tubes in the control block 80.

To begin a pumping operation, the fluid to be pumped will have been completely introduced into the interior of the pump 10 such that the passages of control block 80 and the filter cartridge cavity 96 are entirely full of fluid and the cartridge 112 is saturated. This may be manually accomplished the first time the pump is assembled or the filter is changed and will be a relatively constant state from then on.

To introduce further fluid into the pump head assembly 10 a low pressure zone is created in the resorvoir cavity 60 by pneumatic action on the pneumatic connector 58 while simultaneously the inlet valve zone 33 is opened by creation of a low pressure zone behind the corresponding valve deformation zone 91. When the lower membrane 72 deforms downward into the reservoir cavity 60 a pressure imbalance is created such that fluid is drawn through the threaded fluid port 88, the vertical port tube 90 and the valve tube 92 to enter the cartridge cavity 96 through the bubble channel 94. This will continue until the cartridge cavity 96 is filled completely in its new volume. At this point the inlet valve zone 33 is closed by positive pneumatic pressure being applied to the valve deformation zone 91 such that it occludes the vertical port tube 90 and the valve tube 92, thus preventing the flow of fluid into the chamber from the inlet.

The outlet valve zone 34 is then opened by application of negative pneumatic pressure to the associated valve deformation zone 91 such that fluid flow is permitted from the outlet port tube 100 to the associated vertical tube 92. When the fluid flow path through the outlet valve zone 34 is opened, positive pneumatic pressure is applied through the pneumatic connector 58 is order to deform the bottom membrane 72 into the cartridge cavity 96. In this manner, a pressure imbalance is created and the fluid is forced through the outlet tube 100 to its eventual destination.

The only way for fluid to access the outlet port tube 100 is to have first passed through the filter cartridge 112. This is because the outlet port tube 100 is isolated from the cartridge cavity 96 by the filter cartridge 112 and the sealing O-ring 126 interfacing with the cartridge interface depression 98. This insures that the fluid which is delivered from the outlet portion of the pump 10 will have been thoroughly filtered by passing through a filter disk 120 and will have the particulate contamination removed prior to use.

If, as sometimes happens, bubbles are sucked into the chamber or created in the operation of the pump, they will, by operation of gravity, congregate in the bubble capture channel 94 which forms the highest internal part of the pumping chamber. In the preferred structure the bleed valve zone 35 is slaved to the outlet valve zone 34 so that automatic bleeding occurs in each pumping cycle. The structure is such that gas is bled from the system at a rapid rate but liquid flow is primarily blocked by the blocking ball 108. These bubbles may then be removed from the system by opening the bleed valve zone 35 which is directly connected to the bubble capture channel 94 by the valve tube 92. The degree of flow through the bleed valve zone 35 is controlled by the setting of the set screw 110 and the blocking ball 108 and the bleeder valve cylinder 106. In this manner, the amount of fluid expelled from the system during the operation of the bleeder valve is optimized. For the bleed mechanism to operate properly, it is important that the assembly 10 be mounted in a vertical orientation. Only by having the bubble capture channel 94 situated at the highest point of the fluid cavity 96 can it be assured that the bubbles will congregate in a location wherein it is possible to bleed them out of the system. Therefore, although the other aspect of the pump may work in orientations other than vertical, this feature will be in orientations other than vertical, this feature will be inoperable if the orientation is altered significantly.

When it is desired to change the filter cartridge 112, it is only necessary to close the valve mechanism associated with the inlet, and to pump the maximum amount of fluid out of the chamber 96 by opening the valve mechanism associated with the outlet and applying positive pnuematic pressure to the lower membrane 72 so that a minimum amount of fluid is contained within the pump. At this point the ring fastener 28 may be removed and the entire bottom cap 22 may be separated from the barrel 20. The exposed bottom end plate 116 of the filter cartridge 112 may then be grasped by various means and pulled out of the cartridge cavity 96. A new filter cartridge 112 is then installed. The positioning ring 128 is fitted at the lower end of the filter cartridge 112 and acts to force the cartridge 112 upward into the interface depression 98 when the bottom cap 22 is replaced. The Teflon TM liner subassembly 14 is "floating" to a certain degree with respect to the case subassembly 12. Tightening of the fastener 28 thus forces the subassembly 16 into a tight position and "welds" the Teflon TM members to one another. This assures a good seal. The positioning ring also provides a smooth surface about which the bottom membrane 72 can deform. When the cartridge installation is completed, the pump is refilled with fluid and will operate properly without any priming.

The operation of the alternative embodiments 510 and 610 will be substantially similar. In these embodiments the pneumatic pumping pressure will deform the tubular membrane and the bellows membrane 6146, respectively, with the same result of forcing the liquid through the filter cartridge and out the outlet port 100.

In the second alternate embodiment 610 the cartridge change operation will be altered in that the filter cartridge 6112 is accessible only from the top. In this embodiment the upper ring fastener 6144 is removed and the control block 80, including the embedded filter cartridge 6112 is extracted. The cartridge 6112 is then removed and replaced as before and the pump head is reassembled and ready for further use. Tightening the upper ring fastener 6144 assures a good seal and leak-free operation.

Since the filter pump head assembly 10 of the present invention and the various available alternate embodiments thereof are particularly adapted to create numerous advantages in pumping filtered fluids, it is expected that a wide market will exist therefor. This will be especially true in the semiconductor manufacture industry and other areas of technology wherein it is desirable to pump precise amounts of uncontaminated volatile or reactive materials. This adaptability of the assembly to fluids of different viscosities also creates a market advantage. Accordingly, the commercial liability and industrial applicability of the invention is expected to be substantial and widespread.

I claim:
1. A filter pump head assembly, comprising:

an exterior frame member including an upper cap, a central barrel portion, and a lower cap and further including means for fastening said portions together to form an enclosed volume;

liner means adapted to fit within said barrel portion, the liner means including a control block portion adapted to be situated at the end of said barrel portion near said upper cap, said control block portion having paired apertures formed therein to permit fluid flow therethrough, and a hollow cylindrical portion extending from said solid portion and abutting against the interior of said barrel portion throughout the remainder of its extent;

filter means adapted to fit within said hollow portion such that all fluid flowing completely through the assembly must pass through the filter means;

first membrane means for blocking and unblocking said apertures in said control block portion to permit fluid flow therethrough; and second membrane means adapted to alter the effective volume of said hollow portion;

first pneumatic means for selectively deforming said first membrane means;

second pneumatic means for selectively deforming said second membrane means; and sealing means to restrain fluid to positions intermediate said first membrane means and said second membrane means.

2. The pump head assembly of claim 1 wherein the filter means includes a cartridge adapted to mate with said control block portion.

3. A unitary filter pump head assembly adapted for operation in conjunction with pneumatic control apparatus, to pump fluids, comprising:
an enclosing frame subassembly, including pneumatic connector means to permit flow of pneumatic gas between the pneumatic control apparatus and the interior of the enclosing frame;

an enclosing liner subassembly, exteriorally bounded by the frame subassembly, to form therebetween one or more pneumatic valve control cavities and one or more pneumatic pumping cavities, including, a control block portion including a plurality of ports and passages, pneumatically deformable valve means situated intermediate said control block and said valve control cavity for selectively blocking and unblocking said ports and passages, a fluid containing cavity adjacent to said control block portion, pneumatically deformable pumping means situated intermediate said pumping cavity and said fluid containing cavity for pumping fluid by altering the relative volumes of said pumping cavity and said fluid containing cavity, fluid input means, and fluid output means for respectively delivering fluid between said fluid cavity and the exterior of the assembly; and a filter subassembly situated within said fluid cavity such that fluid is required to pass therethrough in order to pass from said fluid input means to said fluid output means.

4. The pump head assembly of claim 3 wherein said pneumatically deformable pumping means includes a tubular membrane circumferentially surrounding said fluid cavity.

5. The pump head assembly of claim 3 wherein said pneumatically deformable pumping means includes a bellows membrane enclosing said fluid cavity.

6. The pumping head assembly of claim 3 wherein all components of the liner subassembly are constructed of chemically inert materials.

7. The pump head assembly of claim 3 wherein all components of the liner subassembly are constructed of Teflon TM.

8. The pump head assembly of claim 3 wherein the second membrane means includes a bellows membrane adapted to longitudinally expand and compress depending upon the relative pneumatic pressure provided by said second pneumatic means.

9. The pump head assembly of claim 3 wherein the enclosing frame subassembly includes a top cap portion adjacent to said pneumatic valve control cavity, a barrel portion circumferentially enclosing said fluid containing cavity, a bottom cap portion adjacent to said pumping cavity and fastening means for securing said enclosing frame portions together.

10. The pump head assembly of claim 9 wherein said pneumatically deformable pumping means includes a disk membrane interposed between said bottom cap portion and said barrel portion.

11. The pump head assembly of claim 3 or 9 wherein said control block portion is in the form of a rigid disk and said fluid input means includes inlet port means connecting an external source of fluid to said fluid cavity and said fluid output means includes outlet port means connecting said filter subassembly to an external destination site.

12. The pump head assembly of claim 11 wherein said control block is situated physically above said fluid cavity and includes a bubble capture channel formed on the lower surface thereof; and
said input port means connects to said fluid cavity at the upper portion of said bubble capture channel.

13. The pump head assembly of claim 12 wherein said control block further includes bleed port means connecting the exterior of the assembly to said bubble capture channel.

14. The pump head assembly of claim 13 wherein said bleed port means includes blocking means for partially occluding the port means so as to preferentially permit the passage of gas rather than liquid.

15. The pump head assembly of claim 11 wherein said input port means and said output port means each include, at physically separated positions on the surface of said control block adjacent to said pneumatically deformable valve means, a pair of spaced-apart apertures; and
said pneumatically deformable valve means incudes valve deformation zones adjacent to said spaced-apart apertures such that said valve deformation zones may be selectively deformed so as to occlude said respective apertures and prohibit fluid flow therebetween or to provide a fluid flow path between said spacedapart apertures so as to permit fluid flow through said input port means and said output means respectively.

16. The pump head assembly of claim 15 wherein said pneumatically deformable valve means includes a flexible membrane.

17. The pump head assembly of claim 11 wherein the filter subassembly includes filter cartridge means adapted to mate with a corresponding depression in said control block portion to form a seal therewith such that fluid passing through said filter cartridge means is delivered to said outlet port means.

18. The pump head assembly of claim 17 wherein said filter cartridge means is a multiple disk filter cartridge.

19. The pump head assembly of claim 17 wherein said filter cartridge means is a pleated filter cartridge.

20. The pump head assembly of claim 17 wherein said filter cartridge means are urged to mate with said control block portion by a positioning ring interposed between said filter cartridge means and the enclosing frame subassembly.

* * * * *